(12) United States Patent
Fukui (10) Patent No.: US 7,855,987 B2
(45) Date of Patent: Dec. 21, 2010

(54) PACKET COMMUNICATION SYSTEM AND PACKET COMMUNICATION METHOD

(75) Inventor: Akito Fukui, Yokohama (JP)

(73) Assignee: Panasonic Corporation, Osaka (JP)

( * ) Notice: Subject to any disclaimer, the term of this patent is extended or adjusted under 35 U.S.C. 154(b) by 581 days.

(21) Appl. No.: 10/566,255

(22) PCT Filed: Jul. 29, 2004

(86) PCT No.: PCT/JP2004/011204

§ 371 (c)(1),
(2), (4) Date: Jan. 30, 2006

(87) PCT Pub. No.: WO2005/013570

PCT Pub. Date: Feb. 10, 2005

(65) Prior Publication Data

US 2007/0268894 A1    Nov. 22, 2007

(30) Foreign Application Priority Data

Aug. 1, 2003    (JP) .............................. 2003-284930

(51) Int. Cl.
*H04W 4/00* (2009.01)
(52) U.S. Cl. .................................................... 370/328
(58) Field of Classification Search ................. 370/218, 370/338, 389, 328
See application file for complete search history.

(56) References Cited

U.S. PATENT DOCUMENTS

| | | | |
|---|---|---|---|
| 5,796,740 A * | 8/1998 | Perlman et al. ............. 370/401 |
| 6,553,219 B1 * | 4/2003 | Vilander et al. ............. 455/411 |
| 6,735,187 B1 * | 5/2004 | Helander et al. ............ 370/338 |
| 7,042,855 B1 * | 5/2006 | Gilchrist et al. ............ 370/328 |
| 7,143,187 B1 * | 11/2006 | Takeda et al. ............... 709/245 |
| 7,363,341 B2 * | 4/2008 | Koshino et al. ............. 709/203 |
| 2004/0213297 A1 | 10/2004 | Isokangas |
| 2006/0135159 A1 * | 6/2006 | Andersen et al. .......... 455/435.1 |

FOREIGN PATENT DOCUMENTS

| | | |
|---|---|---|
| EP | 1133205 | 9/2001 |
| JP | 2001-312792 | 11/2001 |
| JP | 2001308781 | 11/2001 |
| JP | 2002185500 | 6/2002 |
| JP | 2003520535 | 7/2003 |
| WO | 00/48365 | 8/2000 |
| WO | 0154437 | 7/2001 |
| WO | 03/044999 | 5/2003 |

OTHER PUBLICATIONS

PCT International Search Report dated Nov. 22, 2004.

(Continued)

*Primary Examiner*—Derrick W Ferris
*Assistant Examiner*—Mohammad Anwar
(74) *Attorney, Agent, or Firm*—Dickinson Wright PLLC (57) ABSTRACT

User communication apparatus 110 in packet communication system 100 has internal network 111, base station apparatus 112, internal server 113, radio network control apparatus 114 and mobile communication terminal apparatus 151. Radio network control apparatus 114 receives an IP packet from mobile communication terminal apparatus 115 via base station apparatus 112 and internal network 111, and directly transfers the IP packet to internal server 113 via internal network 111.

2 Claims, 7 Drawing Sheets

OTHER PUBLICATIONS

3GPP TS23.060 v6.11.0: "General Packet Radio Service (GPRS); Service description; Stage 2 (Release 6)," Dec. 2005, pp. 1-212.

O. Granberg: "GSM on the Net," Ericsson Review No. 4, 1998, pp. 184-191.

Interwave Communications: "Home Zone: Using GSM to Provide Wireless Local Loop Services," 2002, pp. 1-8.

Curian Li, et al., "Lu interface description of WCDMA," Telecommunications Network Technology, No. 4, pp. 14-17, Aug. 2001.

Japanese Office Action dated Nov. 11, 2008 with English translation.

Morihisa Momona, et al., "A Proposal of All-IP Mobile Network Architecture (1),"—Evolution beyond IMT-2000-, Information Processing Society of Japan, May 24, 2002, pp. 1-6.

3GPP TS 25.401 V5.6.0 Release 5, "Universal Mobile Telecommunications System (UMTS); UTRAN overall description (3GPP TS 25.401 V5.6.0 Release 5) ETSI TS 125 401," ETSI Standards, France, vol. 3-R3 No. V5.6.0, Jun. 2003, pp. 1-45.

3GPP TS 25.301 V5.2.0 Release 5, "Universal Mobile Telecommunications System (UMTS); Radio Interface Protocol Architecture (3GPP TS 25.301 V5.2.0 Release 5) ETSI TS 125 301," ETSI Standards, France, vol. 3-R2 No. V5.2.0, Sep. 2002, pp. 1-43.

3GPP TS 23.060 V5.6.0 Release 5, "Digital cellular telecommunications system (Phase 2+); Univesal Mobile Telecommunications System (UMTS); General Packet radio Service (GPRS) Service description; Stage 2 (3GPP TS 23.060 V5.6.0 Release 5) ETSI TS 123-060," ETSI Standards, France, vol. 3-SA2 No. V5.6.0, Jun. 2003, pp. 1-208.

* cited by examiner

PACKET COMMUNICATION SYSTEM AND PACKET COMMUNICATION METHOD

TECHNICAL FIELD

The present invention relates to a packet communication system and packet communication method in which packets are communicated between a user communication apparatus and an operator communication apparatus.

BACKGROUND ART

Figure 1:
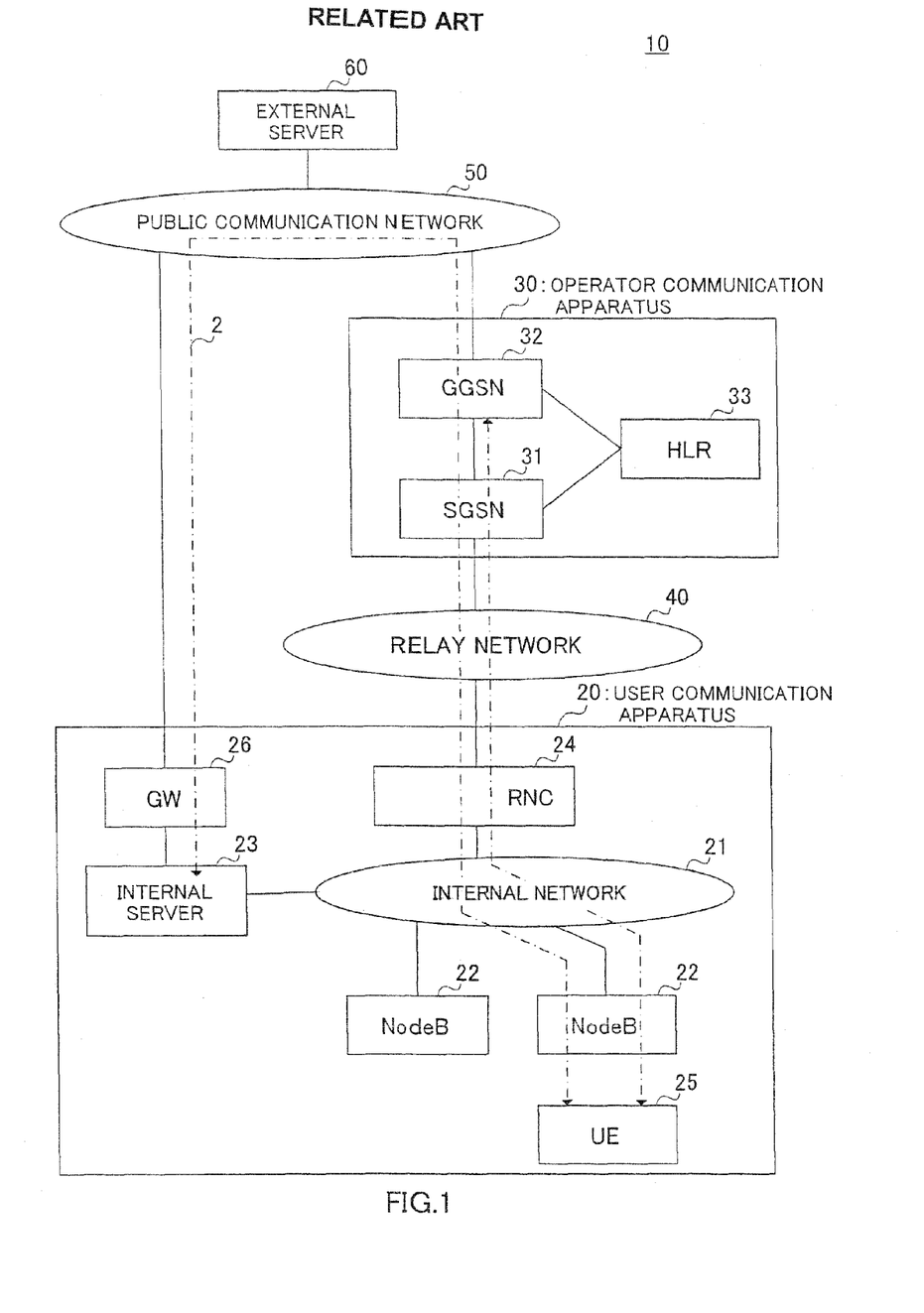
FIG. 1 is a configuration diagram illustrating a conventional packet communication system.

FIG. 1 is a configuration diagram illustrating a packet communication system which applies a GPRS-scheme mobile communication packet system disclosed in Non-patent Document 1 (3GPP, TS23.060 General Packet Radio Service (GPRS) Service description; Stage 2).

As shown in FIG. 1, packet communication system 10 is provided with user communication apparatus 20, operator communication apparatus 30 that performs communications with user communication apparatus 20, relay network 40 that relays the communications between user communication apparatus 20 and operator communication apparatus 30, public communication network 50 that performs communications with both user communication apparatus 20 and operator communication apparatus 30, and external server 60 that performs communications with public communication network 50.

User communication apparatus 20 is provided with internal network 21, base station apparatuses (Node B) 22 connected to internal network 21, internal server 23 connected to internal network 21, radio network control (RNC) apparatus 24 connected between internal network 21 and operator communication apparatus 30, mobile communication terminal apparatus (UE) 25 that performs communications with base station apparatus 22 by radio signal, and gateway (GW) apparatus 26 connected between internal network 21 and public communication network 50.

Operator communication apparatus 30 is provided with core network (CN) apparatuses such as serving GPRS support node (SGSN) 31, gateway GPRS support node (GGSN) 32, and home location resistor (HLR) 33.

In packet communication system 10, mobile communication terminal apparatus 25 is capable of gaining access to public communication network 50 and external server 60 via base station apparatus 22, internal network 21, radio network control (RNC) apparatus 24, relay network 40 and operator communication apparatus 30 (via communication path 1).

Further, in packet communication apparatus 10, mobile communication terminal apparatus 25 is capable of gaining access to internal server 23 via base station apparatus 22, internal network 21, radio network control (RNC) apparatus 24, relay network 40, operator communication apparatus 30, public communication network 50 and gateway apparatus 26 (via communication path 2).

Figure 2:
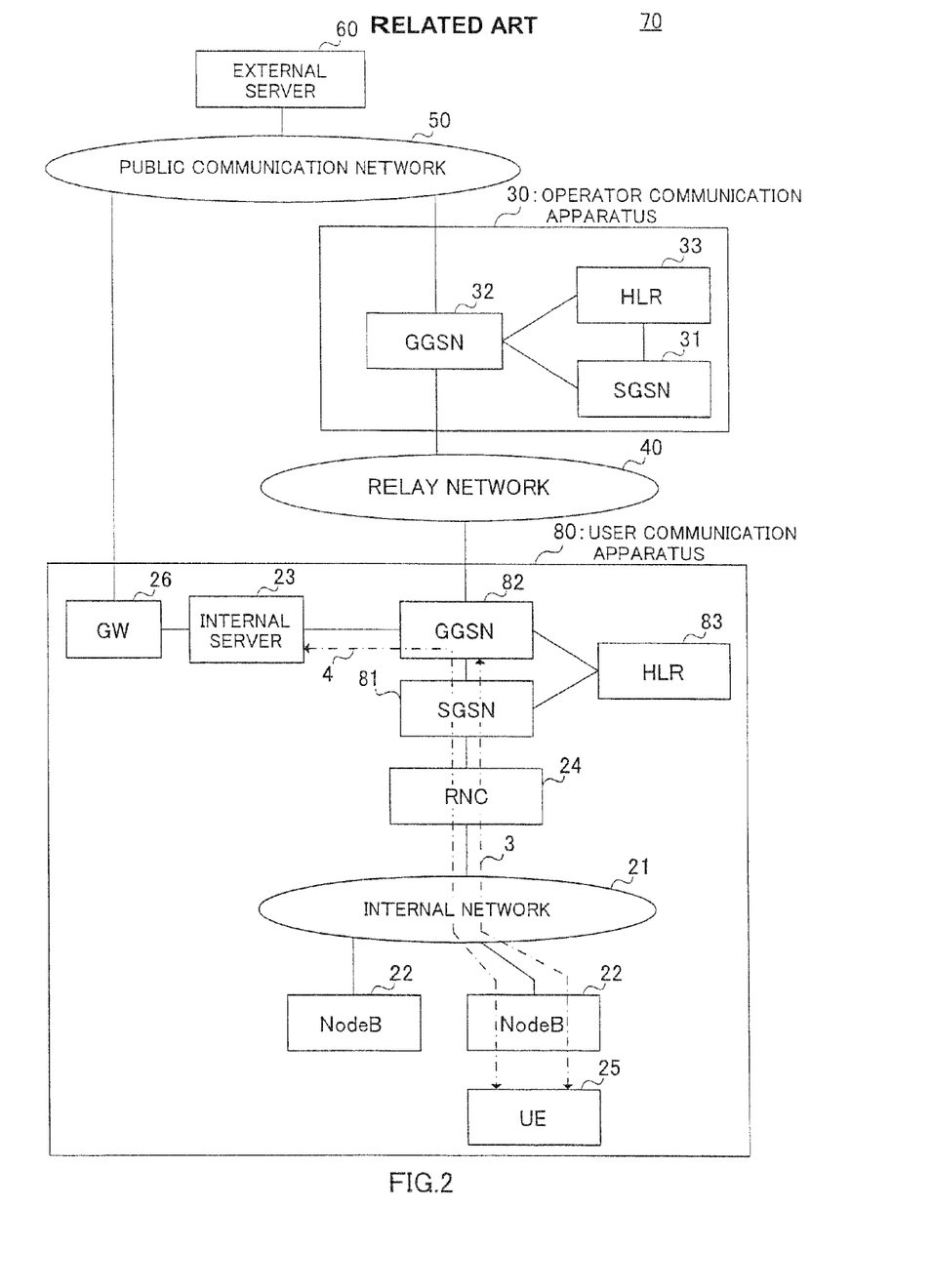
FIG. 2 is a configuration diagram illustrating another conventional packet communication system.

FIG. 2 is a configuration diagram illustrating a packet communication system disclosed in Non-patent Document 2 (Ericsson Review, "GSM on the net", 1998-04) and Non-patent Document 3 (Inter WAVE, "HOME ZONE: Provide Wireless Local Loop services").

As shown in FIG. 2, packet communication system 70 is provided with user communication apparatus 80, operator communication apparatus 30 that performs communications with user communication apparatus 80, relay network 40 that relays the communications between user communication apparatus 80 and operator communication apparatus 30, public communication network 50 that performs communications with both user communication apparatus 80 and operator communication apparatus 30, and external server 60 that performs communications with public communication network 50.

User communication apparatus 80 is provided with internal network 21, base station apparatuses (Node B) 22 connected to internal network 21, internal server 23, radio network control (RNC) apparatus 24 connected between internal network 21 and relay network 40, mobile communication terminal apparatus (UE) 25 that performs communications with base station apparatus 22 by radio signal, gateway (GW) apparatus 26 connected between internal network 21 and public communication network 50, serving GPRS support node (SGSN) 81 connected to radio network control (RNC) apparatus 24, and gateway GPRS support node (GGSN) 82 and home location resistor (HLR) 83 both connected to serving GPRS support node 81. Serving GPRS support node (SGSN) 81 is further connected to internal server 23 and relay network 40.

In packet communication system 70, mobile communication terminal apparatus 25 is capable of gaining access to public communication network 50 and external server 60 via base station apparatus 22, internal network 21, radio network control (RNC) apparatus 24, serving GPRS support node (SGSN) 81, gateway GPRS support node (GGSN) 82, relay network 40 and operator communication apparatus 30 (via communication path 3).

Further, mobile communication terminal apparatus 25 is capable of gaining access to internal server 23 via base station apparatus 22, internal network 21, radio network control (RNC) apparatus 24, serving GPRS support node (SGSN) 81, and gateway GPRS support node (GGSN) 82 (via communication path 4).

However, in conventional packet communication system 10 as shown in FIG. 1, whenever mobile communication terminal apparatus 25 performs a communication to gain access to internal server 23 via base station apparatus 22, internal network 21, radio network control (RNC) apparatus 24, relay network 40, operator communication apparatus 30, public communication network 50 and gateway apparatus 26 (via communication path 2), traffic amounts increase in the relay network, operator communication apparatus 30 and public communication network 50, while a communication fee is required corresponding to the traffic amounts, and there arises a problem that needs to increase processing capabilities of relay network, operator communication apparatus 30 and public communication network 50.

Further, in conventional packet communication system 70 as shown in FIG. 2, user communication apparatus 80 also needs serving GPRS support node (SGSN) 81, and gateway GPRS support node (GGSN) 82 and home location resistor (HLR) 83 both connected to serving GPRS support node 81, causing an issue that the system scale is increased.

DISCLOSURE OF INVENTION

It is an object of the present invention to provide a packet communication system and packet communication method with a small system scale which reduces traffic amounts of an operator communication apparatus and communication network, while decreasing communication fees required corresponding to the traffic amounts, and eliminates the need of increasing processing capabilities of the operator communication apparatus and communication network.

A packet communication system according to a first invention adopts a configuration such that in a packet communication system provided with a user communication apparatus, an operator communication apparatus that performs communications with the user communication apparatus, and a communication network that performs communications with both the user communication apparatus and the operator communication apparatus where the user communication apparatus has an internal network, a base station apparatus connected to the internal network, an internal server connected to the internal network, a radio network control apparatus connected between the internal network and the operator communication apparatus, and a mobile communication terminal apparatus that performs communications with the base station apparatus by radio signal, the radio network control apparatus receives a packet from the mobile communication terminal apparatus via the base station apparatus and the internal network, and directly transfers the packet to the internal server via the internal network.

A radio network control apparatus according to a second invention is a radio network control apparatus in a packet communication system provided with a user communication apparatus, an operator communication apparatus that performs communications with the user communication apparatus, and a communication network that performs communications with both the user communication apparatus and the operator communication apparatus where the user communication apparatus has an internal network, a base station apparatus connected to the internal network, an internal server connected to the internal network, the radio network control apparatus connected between the internal network and the operator communication apparatus, and a mobile communication terminal apparatus that performs communications with the base station apparatus by radio signal, and adopts a configuration to receive a packet from the mobile communication terminal apparatus via the base station apparatus and the internal network, and directly transfer the packet to the internal server via the internal network.

A packet communication method according to a third invention is a packet communication method in a packet communication system provided with a user communication apparatus, an operator communication apparatus that performs communications with the user communication apparatus, and a communication network that performs communications with both the user communication apparatus and the operator communication apparatus where the user communication apparatus has an internal network, a base station apparatus connected to the internal network, an internal server connected to the internal network, a radio network control apparatus connected between the internal network and the operator communication apparatus, and a mobile communication terminal apparatus that performs communications with the base station apparatus by radio signal, and is provided with a step for the radio network control apparatus to receive a packet from the mobile communication terminal apparatus via the base station apparatus and the internal network, and directly transfer the packet to the internal server via the internal network.

A packet communication program according to a fourth invention is a packet communication program to make a computer execute packet communications in a packet communication system provided with a user communication apparatus, an operator communication apparatus that performs communications with the user communication apparatus and a communication network that performs communications with both the user communication apparatus and the operator communication apparatus where the user communication apparatus has an internal network, a base station apparatus connected to the internal network, an internal server connected to the internal network, a radio network control apparatus connected between the internal network and the operator communication apparatus, and a mobile communication terminal apparatus that performs communications with the base station apparatus by radio signal, and makes the computer execute a step for the radio network control apparatus to receive a packet from the mobile communication terminal apparatus via the base station apparatus and the internal network, and directly transfer the packet to the internal server via the internal network.

BEST MODE FOR CARRYING OUT THE INVENTION

Embodiments of the present invention will specifically be described below with reference to accompanying drawings.

Embodiment 1

Figure 3:
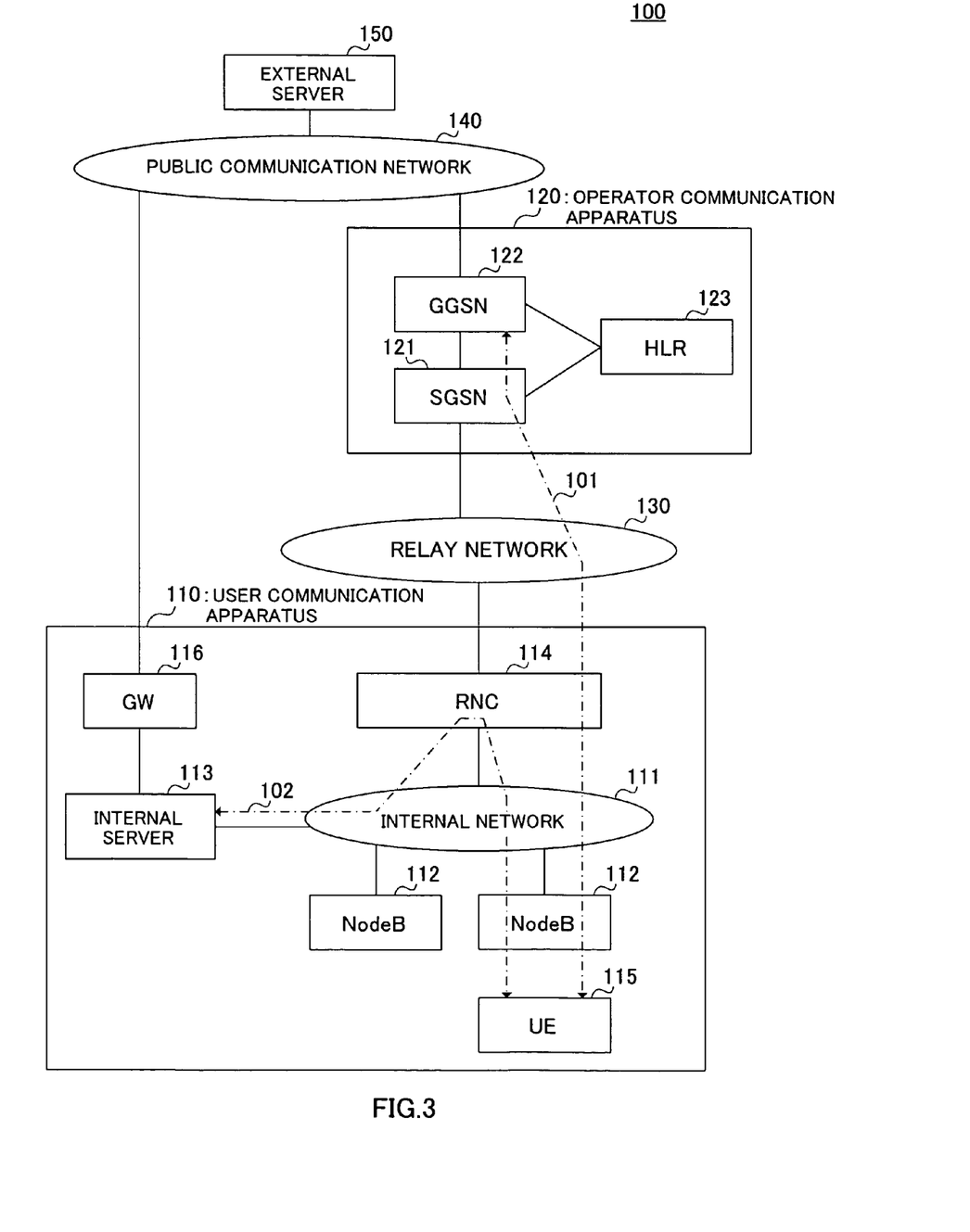
FIG. 3 is a configuration diagram illustrating a packet communication system according to Embodiment 1 of the invention.

FIG. 3 is a configuration diagram illustrating a packet communication system according to Embodiment 1 of the invention.

As shown in FIG. 3, packet communication system 100 according to Embodiment 1 of the invention is provided with user communication apparatus 110, operator communication apparatus 120 that performs communications with user communication apparatus 110, relay network 130 that relays the communications between user communication apparatus 110 and operator communication apparatus 120, public communication network 140 that performs communications with both user communication apparatus 110 and operator communication apparatus 120, and external server 150 that performs communications with public communication network 140.

User communication apparatus 110 is provided with internal network 111, base station apparatuses (Node B) 112 connected to internal network 111, internal server 113 connected to internal network 11, radio network control (RNC) apparatus 114 connected between internal network 111 and relay network 130, mobile communication terminal apparatus (UE) 115 that performs communications with base station apparatus 112 by radio signal, and gateway (GW) apparatus 116 connected between internal network 111 and public communication network 140.

Operator communication apparatus 120 is provided with core network (CN) apparatuses such as serving GPRS support node (SGSN) 121, gateway GPRS support node (GGSN) 122, and home location resistor (HLR) 123.

Serving GPRS support node (SGSN) 121, gateway GPRS support node (GGSN) 122, and home location resistor (HLR) 123 are mutually connected. Further, serving GPRS support node 121 is connected to relay network 130, while gateway GPRS support node 122 is connected to public communication network 140.

Mobile communication terminal apparatus 115 is capable of performing communications with both public communication network 140 and external server 150 via base station apparatus 112, internal network 111, radio network control apparatus 114, relay network 130 and operator communication apparatus 120 (via communication path 101).

Radio network control apparatus 114 is capable of receiving an IP packet from mobile communication terminal apparatus 115 via base station apparatus 112 and internal network 111 and directly transferring the IP packet to internal server 113 via internal network 111 (via communication path 102). Internal server 113 is capable of transferring an IP packet to radio network control apparatus 114 via internal network 111 (via communication path 102), and radio network control apparatus 114 is capable of transferring the IP packet from internal server 113 to mobile communication terminal apparatus 115 via internal network 111 and base station apparatus 112.

In other words, mobile communication terminal apparatus 115 is able to transmit and receive an IP packet to/from internal server 113 directly via base station apparatus 112, internal network 111 and radio network control apparatus 114 without using delay network 130, operator communication apparatus 120 and public communication network 140.

Packet communication system 100 according to Embodiment 1 of the invention will be described below more specifically with reference to FIGS. 4, 5A, 5B and 6 together with FIG. 3.

Figure 4:
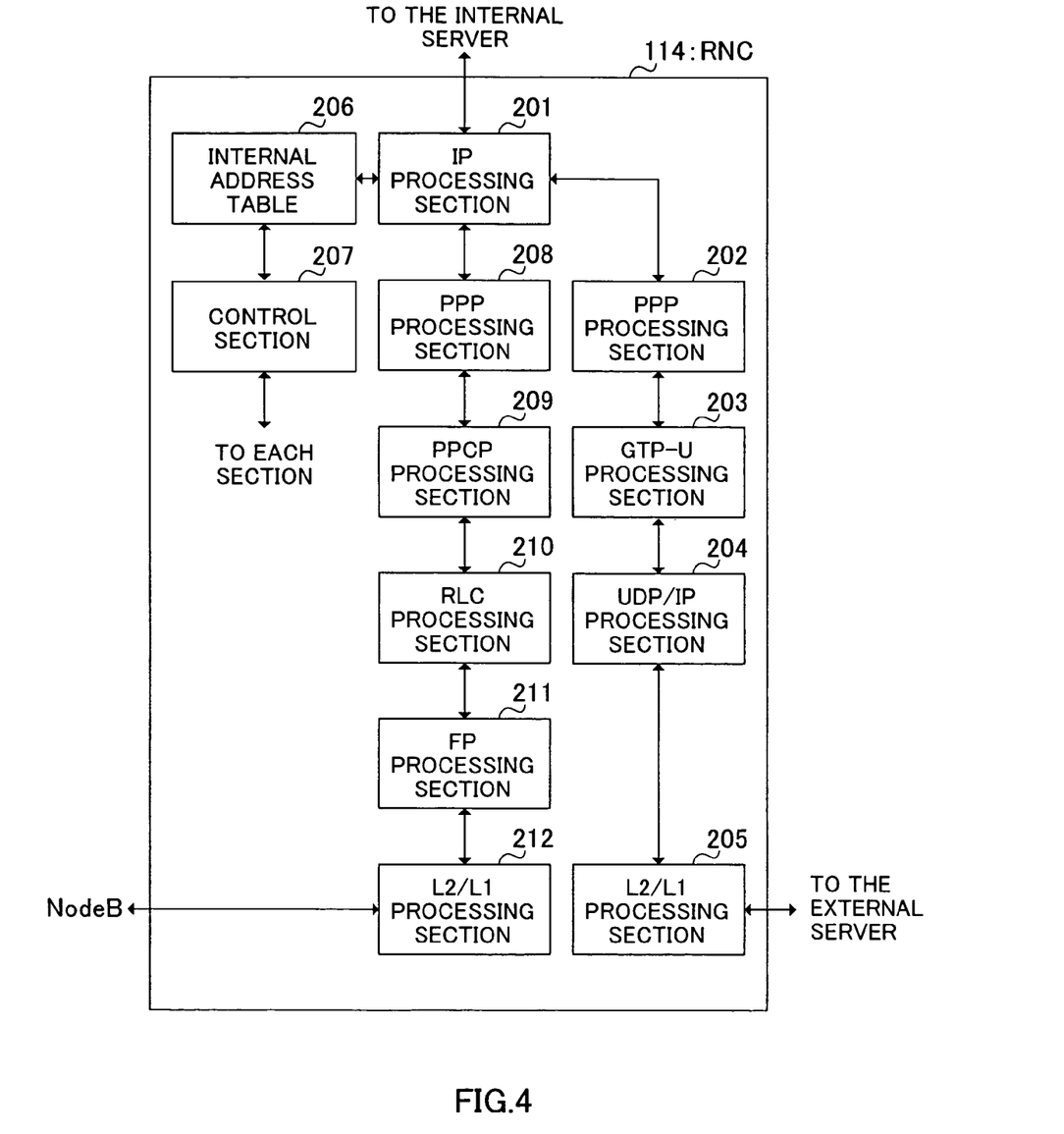
FIG. 4 is a block diagram illustrating a configuration of a radio network control apparatus in the packet communication system according to Embodiment 1 of the invention.

FIG. 4 is a block diagram illustrating a configuration of radio network control apparatus 114 in packet communication system 100 according to Embodiment 1 of the invention.

As shown in FIG. 4, radio network control apparatus 114 is provided with IP processing section 201, PPP processing section 202, GTP-U processing section 203, UDP/IP processing section 204, L2/L1 processing section 205, internal address table 206, control section 207, PPP processing section 208, PPCP processing section 209, RLC processing section 210, FP processing section 211 and L2/L1 processing section 212.

Internal address table 206 stores IP addresses of IP packets to directly transfer to internal server 113. IP processing section 201 compares an IP address of a received IP packet with the IP addresses stored in internal address table 206, and when the received IP packet is to be sent to internal server 113, transfers the IP packet toward internal server 113.

Further, when the received IP packet is to GPRS support node (SGSN) 121, IP processing section 201 transfers the IP packet to PPP processing section 202. The IP packet received in PPP processing section 202 is transferred to serving GPRS support node (SGSN) 121 via GTP-U processing section 203, UDP/IP processing section 204 and L2/L1 processing section 205.

Control section 207 performs processing such as initialization, setting and the like of each section as shown in FIG. 4.

Figure 5A:
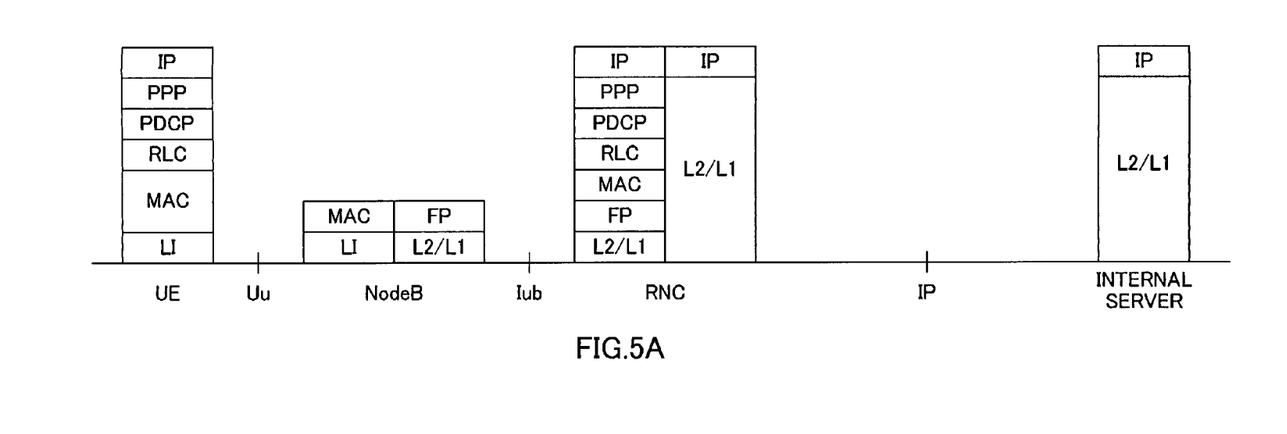
FIG. 5A is a diagram to explain protocol stack in user plane in the case where a mobile communication terminal apparatus gains access to an internal server in the packet communication system according to Embodiment 1 of the invention.
Figure 5B:
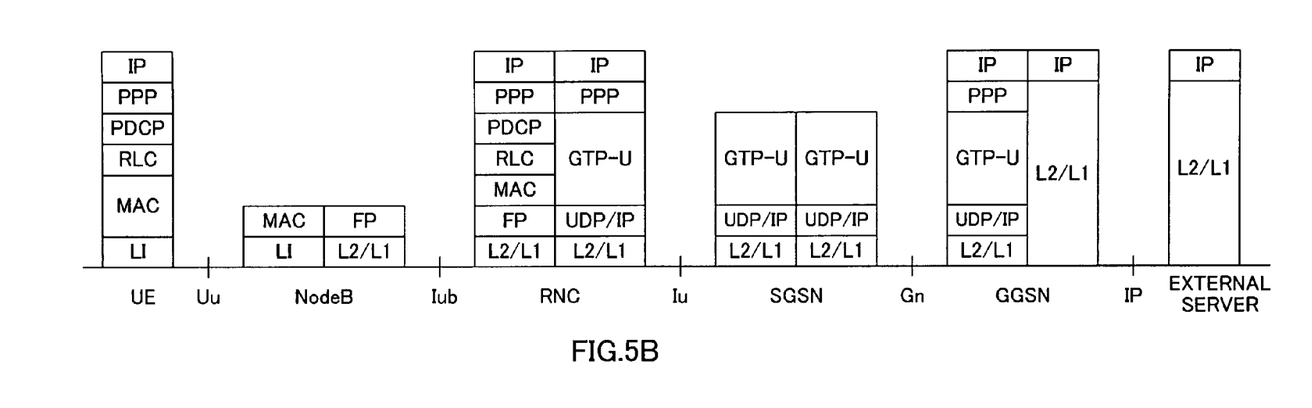
FIG. 5B is a diagram to explain protocol stack in user plane in the case where a mobile communication terminal apparatus gains access to an external server in the packet communication system according to Embodiment 1 of the invention.

Each section in the block except the foregoing in radio network control apparatus 114 performs protocol processing in FIGS. 5A and 5B.

FIG. 5A is a diagram to explain protocol stack in user plane in the case where mobile communication terminal apparatus 115 gains access to internal server 113 in packet communication system 100 according to Embodiment 1 of the invention. In the case where mobile communication terminal apparatus 115 gains access to internal server 113, radio network control (RNC) apparatus 114 performs PPP processing and processing for IP, and when an IP packet received from mobile communication terminal apparatus (UE) 115 is to internal server 113, directly transfers the IP packet to internal server 113.

FIG. 5B is a diagram to explain protocol stack in user plane in the case where mobile communication terminal apparatus 115 gains access to external server 150 in packet communication system 100 according to Embodiment 1 of the invention. In the case where mobile communication terminal apparatus 115 gains access to external server 150, radio network control (RNC) apparatus 114 performs PPP processing and processing for IP, and when an IP packet received from mobile communication terminal apparatus (UE) 115 is to be sent to serving GPRS support node (SGSN) 121, performs again the PPP processing and processing for IP, and GTP-U processing section 203 transfers the IP packet to serving GPRS support node (SGSN) 121.

Described below are protocols of mobile communication terminal apparatus (UE) 115, base station apparatus (Node B) 112, serving GPRS support node (SGSN) 121, gateway GPRS support node (GGSN) 122, internal server 113 and external server 150, except radio network control (RNC) apparatus 114. These protocols are the same as conventional protocols.

Mobile communication terminal apparatus (UE) 115 performs processing for radio layer 1 (PHY), radio layer 2 (MAC, RLC and PDCP), PPP and IP. PPP is optional and not essential. Processing for PHY, MAC, RLC and PDCP as described in 3GPP, TS25.301 is performed for radio layer 1 (PHY) and radio layer 2 (MAC, RLC and PDCP).

For example, PHY performs processing of radio layer 1 for radio transmission. MAC performs multiplexing, demultiplexing, confidential processing and the like between the logic channel and transport channel. RLC recovers errors on the radio channel by repeat control. PDCP performs compression processing of IP header and the like.

Base station apparatus (Node B) performs processing of radio layer 1 (PHY) and radio layer 2 (MAC) on the mobile communication terminal apparatus (UE) 115 side, and processing of frame protocol (FP) and layer 2•layer 1 (L2/L1) of cable transmission on the radio network control (RNC) apparatus 114 side.

Radio layer 1 (PHY) and radio layer 2 (MAC) performs processing of PHY and MAC as described in 3GPP, TS25.301. Frame protocol (FP) performs processing of Frame Protocol entity as described in 3GPP, TS25.401. FP performs processing of synchronization between the Node B and RNC, transmission of radio quality information and transfer of RLC-PDU (protocol data unit of RLC). Layer 2•layer 1 (L2/L1) of cable transmission performs processing of layer 1 and layer 2 of cable transmission. As layer 2•layer 1 (L2/L1) of cable transmission, AAL2/ATM/T1 and IP/Ethernet (R) may be applied, for example.

The radio network control (RNC) apparatus performs processing of Layer 2•Layer 1 (L2/L1) of cable transmission and frame protocol (FP) on the base station apparatus (Node B) 112 side, processing of radio layer 2 (MAC, RLC and PDCP)

on the UE side, and processing of Layer 2•layer 1 (L2/L1) of cable transmission, UDP/IP and GTP/U on the SGSN side.

Layer 2•layer 1 (L2/L1) of cable transmission on the SGSN side performs processing of layer 1 and layer 2 of cable transmission. As layer 2•layer 1 (L2/L1) of cable transmission on the SGSN side, for example, AAL2/ATM/T1 and IP/Ethernet (R) may be applied, (Protocols other than these protocols may be applied. Further, protocols different from L2/L1 on the Node B side may be use.) GTP-U performs processing of GTP-U as described in Non-patent Document 1. For example, GTP-U performs processing for transferring IP/PPP frames between the RNC and SGSN.

Serving GPRS support node (SGSN) performs processing of layer 2•layer 1 (L2/L1) of cable transmission and UDP/IP and GTP-U on the RNC side, and processing of layer 2•layer 1 (L2/L1) of cable transmission and UDP/IP and GTP-U on the GGSN side. Different protocols may be applied between L2/L1 on the RNC side and L2/L1 on the GGSN side.

Gateway GPRS support node (GGSN) performs processing of layer 2•layer 1 (L2/L1) of cable transmission and UDP/IP and GTP-U on the SGSN side, processing of PPP and IP on the UE side, and processing of layer 2•layer 1 (L2/L1) of cable transmission and IP on the public communication network 140 side. Different protocols may be applied between L2/L1 on the SGSN side and L2/L1 on the public network side.

External server 150 and internal server 113 performs processing of layer 2•layer 1 (L2/L1) of cable transmission and IP.

The mobile communication terminal apparatus (UE) performs processing of radio layer 1 (PHY), radio layer 2 (MAC, RLC and PDCP), radio layer 3 (RRC), and GPRS-scheme session control and mobile control (SM/GMM).

Radio layer 3 (RRC) performs processing of RRC as described in 3GPP, TS25.301. For example, RRC performs setting and release of radio bearer, state measurement of radio channel, handover processing and the like. The processing of GPRS-scheme session control and mobile control (SM/GMM) is described in Non-patent Document 1, and, for example, processing of authentication, position registration, and paging of a UE, setting and release of a session between the UE and SGSN, and the like are performed.

Base station apparatus (Node B) performs processing of radio layer 1 (PHY) and radio layer 2 (MAC) on the UE side, and processing of frame protocol (FP) and layer 2•layer 1 (L2/L1) of cable transmission on the RNC side.

The radio network control (RNC) apparatus performs processing of layer 2•layer 1 (L2/L1) of cable transmission and frame protocol (FP) on the Node B side, processing of radio layer 2 (MAC and RLC) and radio layer 3 (RRC) on the UE side, and processing of layer 2•layer 1 (L2/L1) of cable transmission and RANAP on the SGSN side. Different protocols may be applied between L2/L1 on the RNC side and L2/L1 on the GGSN side.

The processing of RANAP on the SGSN side is described in 3GPP, TS25.413, and processing of setting and release of transport of Iu and processing for transferring SM/GMM message and the like are performed.

The serving GPRS support node (SGSN) performs processing of layer 2•layer 1 (L2/L1) of cable transmission, RANAP and SM/GMM on the RNC side, and processing of layer 2•layer 1 (L2/L1) of cable transmission and GTP-C on the GGSN side. Different protocols may be applied between L2/L1 on the RNC side and L2/L1 on the GGSN side.

The processing of GTP-C on the GGSN side is described in Non-patent Document 1, and setting and release of a session between the SGSN and GGSN and the like are performed.

The gateway GPRSGPRS support node (GGSN) performs processing of layer 2•layer 1 (L2/L1) of cable transmission and GTP-C on the SGSN side.

Figure 6:
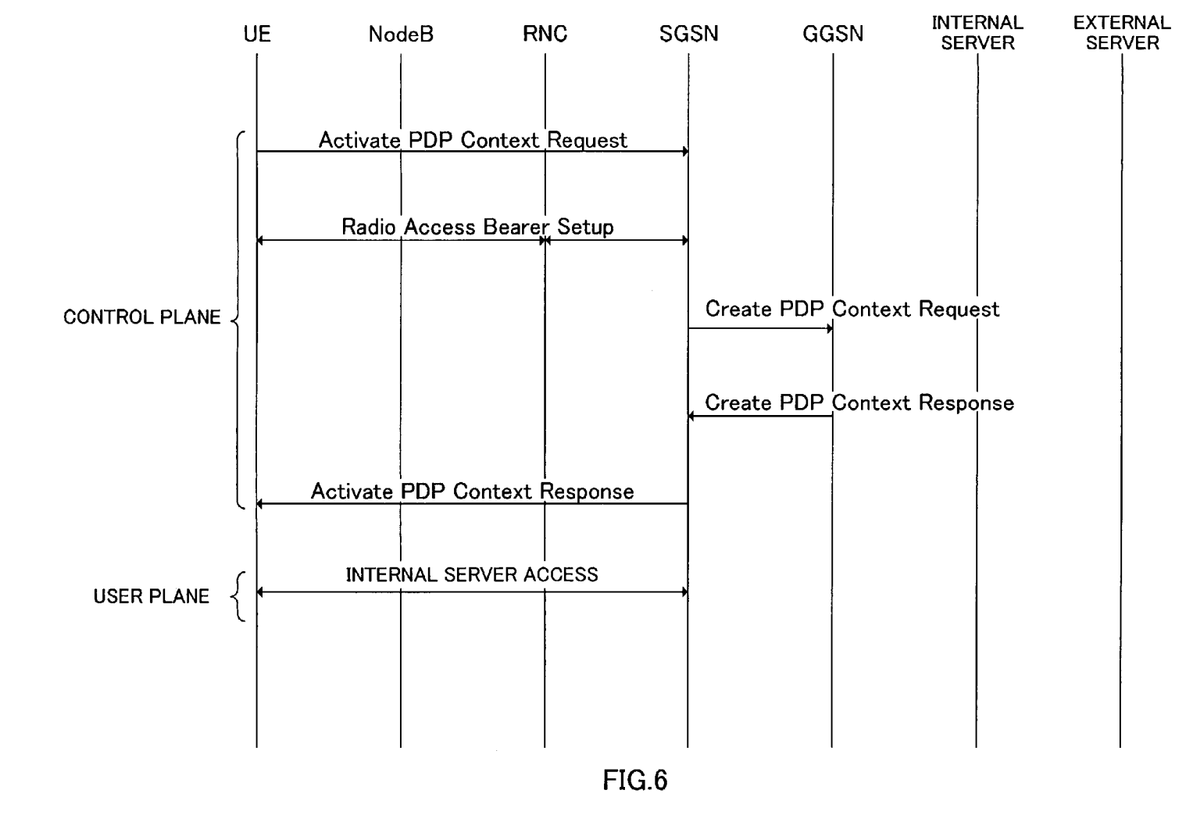
FIG. 6 is a sequence diagram to explain the operation of the packet communication system according to Embodiment 1 of the invention.

FIG. 6 is a sequence diagram to explain the operation of packet communication system 100 according to Embodiment 1 of the invention.

According to procedures up to Activate PDP Context Request, Radio Access Bearer Setup, Create PDP Context Request, Create PDP Context Response and Activate PDP Context Response, sessions for packet transfer are established between the UE and SGSN and between the SGSN and GGSN.

In FIG. 6, when the UE gains access to internal server 113, a packet from the UE is directly transferred to internal server 113 via the Node B and RNC.

Inversely, a packet from internal server 113 is transferred through a path inverse to the foregoing. In this case, IP processing section 201 (see FIG. 4) in the radio network control (RNC) apparatus transfers an IP address that is to internal server 113, after resolving a destination physical address (Ethernet (R) address in the case of Ethernet (R)) corresponding to a destination IP address of an IP address to transmit, using an ARP (Address Resolution Protocol).

The ARP is used to know a physical address of a communicating apparatus whose IP address is known, and simultaneously transmits an ARP request message designating an IP address of the communicating apparatus to all the communication apparatuses on the network. A communication apparatus (which knows its own physical address and IP address) corresponding to the designated IP address transmits a response message with a pair of its own physical address and IP address back to the inquiry source communication apparatus. The inquiry source communication apparatus is thereby capable of generating and updating an entry of a pair of the physical address and IP address.

In FIG. 3, IP processing section 201 in the radio network control (RNC) apparatus transmits the ARP request message set for an IP address of internal server 113, and internal server 113 transmits the response message with a pair of the physical address and IP address back to IP processing section 201 in the radio network control (RNC) apparatus. It is thus possible to transfer an IP packet that is to internal server 113 from radio network control (RNC) apparatus 114.

In addition, the ARP is to resolve a destination physical address, and the packet communication system according to Embodiment 1 of the invention may use protocols other than the ARP.

Embodiment 2

Figure 7:
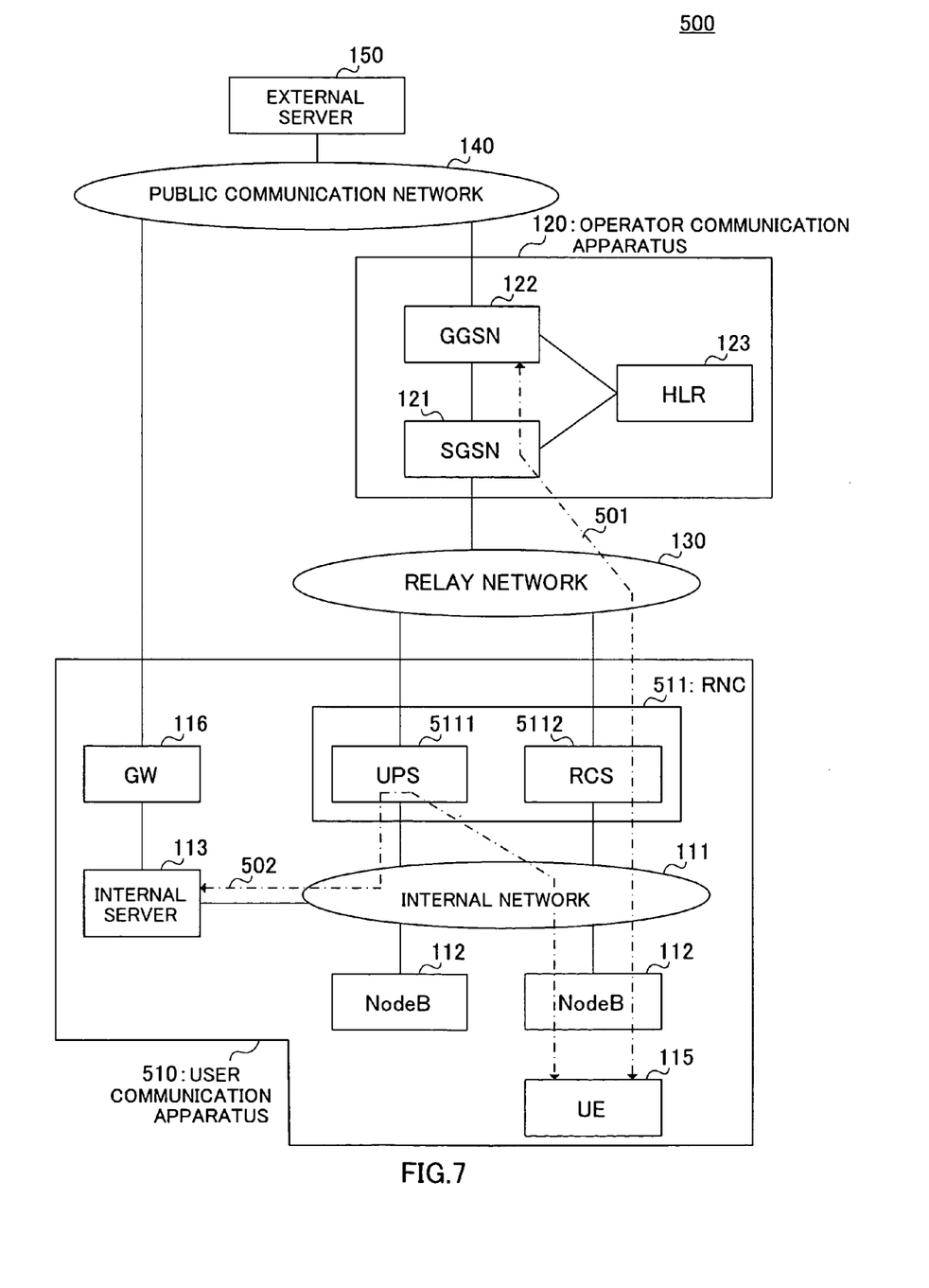
FIG. 7 is a configuration diagram illustrating a packet communication system according to Embodiment 2 of the invention.

Embodiment 2 of the invention will specifically be described bellow with reference to an accompanying drawing. FIG. 7 is a configuration diagram illustrating a packet communication system according to Embodiment 2 of the invention. In Embodiment 2 of the invention, the same structural elements as those in Embodiment 1 are assigned the same reference numerals and descriptions thereof are omitted.

As shown in FIG. 7, packet communication system 500 according to Embodiment 2 of the invention has user communication apparatus 510 as a substitute for user communication apparatus 110 in packet communication system 100 according to Embodiment 1 of the invention. In other words, packet communication system 500 according to Embodiment 2 of the invention is provided with user communication apparatus 510, operator communication apparatus 120 that performs communications with user communication apparatus 510, relay network 130 that relays the communications between user communication apparatus 510 and operator communication apparatus 120, public communication network 140 that performs communications with both user communication apparatus 510 and operator communication apparatus 120, and external server 150 that performs communications with public communication network 140. User communication apparatus 510 has radio network control (RNC) apparatus 511 as a substitute for radio network control (RNC) apparatus 114 in packet communication system 100 according to Embodiment 1 of the invention.

In other words, user communication apparatus 510 is provided with internal network 111, base station apparatuses (Node B) 112 connected to internal network 111, internal server 113 connected to internal network 111, radio network control (RNC) apparatus 511 connected between internal network 111 and relay network 130, mobile communication terminal apparatus (UE) 115 that performs communications with base station apparatus 112 by radio signal, and gateway (GW) apparatus 116 connected between internal network 111 and public communication network 140.

Radio network control (RNC) apparatus 511 has the same function as that of radio network control (RNC) apparatus 114. Radio network control (RNC) apparatus 511 is provided with user plane server (UPS) 5111 and radio control server (RCS) 5112. User plane server (UPS) 5111 executes processing when mobile communication terminal apparatus (UE) 115 communicates with internal server 113. Further, radio control server (RCS) 5112 executes processing when mobile communication terminal apparatus (UE) 115 communicates with external server 150.

In addition, Embodiments 1 and 2 of the invention makes it possible to use other packets as well as IP packets. Further, Embodiments 1 and 2 of the invention may be configured to have a communication network such as a dedicated network as a substitute for public communication network 140. Furthermore, the invention includes packet communication programs to make a computer execute the operation of Embodiments 1 and 2 of the invention.

A packet communication system according to a first aspect of the invention adopts a configuration such that in a packet communication system provided with a user communication apparatus, an operator communication apparatus that performs communications with the user communication apparatus, and a communication network that performs communications with both the user communication apparatus and the operator communication apparatus where the user communication apparatus has an internal network, a base station apparatus connected to the internal network, an internal server connected to the internal network, a radio network control apparatus connected between the internal network and the operator communication apparatus, and a mobile communication terminal apparatus that performs communications with the base station apparatus by radio signal, the radio network control apparatus receives a packet from the mobile communication terminal apparatus via the base station apparatus and the internal network, and directly transfers the packet to the internal server via the internal network.

According to this configuration, since the radio network control apparatus receives a packet from the mobile communication terminal apparatus via the base station apparatus and the internal network directly transfers the packet to the internal server via the internal network and the packet from the mobile communication terminal apparatus is directly transferred to the internal server without using the operator communication apparatus and the communication network, and it is thereby possible to provide a packet communication system with a small system scale which reduces traffic amounts of the operator communication apparatus and communication network, while decreasing communication fees required corresponding to the traffic amounts, and eliminates the need of increasing processing capabilities of the operator communication apparatus and communication network.

A radio network control apparatus according to a second aspect of the invention is a radio network control apparatus in a packet communication system provided with a user communication apparatus, an operator communication apparatus that performs communications with the user communication apparatus, and a communication network that performs communications with both the user communication apparatus and the operator communication apparatus where the user communication apparatus has an internal network, a base station apparatus connected to the internal network, an internal server connected to the internal network, the radio network control apparatus connected between the internal network and the operator communication apparatus, and a mobile communication terminal apparatus that performs communications with the base station apparatus by radio signal, and adopts a configuration to receive a packet from the mobile communication terminal apparatus via the base station apparatus and the internal network, and directly transfer the packet to the internal server via the internal network.

According to this configuration, since the radio network control apparatus receives a packet from the mobile communication terminal apparatus via the base station apparatus and the internal network and directly transfers the packet to the internal server via the internal network, the packet from the mobile communication terminal apparatus is directly transferred to the internal server without using the operator communication apparatus and the communication network, and it is thereby possible to provide a radio network control apparatus in a packet communication system with a small system scale which reduces traffic amounts of the operator communication apparatus and communication network, while decreasing communication fees required corresponding to the traffic amounts, and eliminates the need of increasing processing capabilities of the operator communication apparatus and communication network.

A radio network control apparatus according to a third aspect of the invention adopts a configuration, in the radio network control apparatus according to the second aspect of the invention, which has an internal address table that stores addresses of packets to directly transfer to the internal server, a determiner that compares an address of a packet from the mobile communication terminal apparatus with the addresses stored in the internal address table to determine whether or not the packet from the mobile communication terminal apparatus is to directly transfer to the internal server, and a section that directly transfers the packet to the internal server via the internal network when the determiner determines that the packet is to directly transfer to the internal server.

According to this configuration, since the radio network control apparatus receives a packet from the mobile communication terminal apparatus via the base station apparatus and the internal network, directly transfers the packet to the internal server via the internal network and the packet from the mobile communication terminal apparatus is directly transferred to the internal server without using the operator communication apparatus and the communication network, and it is thereby possible to provide a radio network control apparatus in a packet communication system with a small system scale which reduces traffic amounts of the operator communication apparatus and communication network, while decreasing communication fees required corresponding to the traffic amounts, and eliminates the need of increasing processing capabilities of the relay network, operator communication apparatus and communication network.

A packet communication method according to a fourth aspect of the invention is a packet communication method in a packet communication system provided with a user communication apparatus, an operator communication apparatus that performs communications with the user communication apparatus, and a communication network that performs communications with both the user communication apparatus and the operator communication apparatus where the user communication apparatus has an internal network, a base station apparatus connected to the internal network, an internal server connected to the internal network, a radio network control apparatus connected between the internal network and the operator communication apparatus, and a mobile communication terminal apparatus that performs communications with the base station apparatus by radio signal, and is provided with a step for the radio network control apparatus to receive a packet from the mobile communication terminal apparatus via the base station apparatus and the internal network, and directly transfer the packet to the internal server via the internal network.

According to this method, since the radio network control apparatus receives a packet from the mobile communication terminal apparatus via the base station apparatus and the internal network, directly transfers the packet to the internal server via the internal network and the packet from the mobile communication terminal apparatus is directly transferred to the internal server without the operator communication apparatus and the communication network, and it is thereby possible to provide a packet communication system with a small system scale which reduces traffic amounts of the operator communication apparatus and communication network, while decreasing communication fees required corresponding to the traffic amounts, and eliminates the need of increasing processing capabilities of the operator communication apparatus and communication network.

A packet communication program according to a fifth aspect of the invention is a packet communication program to make a computer execute packet communications in a packet communication system provided with a user communication apparatus, an operator communication apparatus that performs communications with the user communication apparatus, and a communication network that performs communications with both the user communication apparatus and the operator communication apparatus where the user communication apparatus has an internal network, a base station apparatus connected to the internal network, an internal server connected to the internal network, a radio network control apparatus connected between the internal network and the operator communication apparatus, and a mobile communication terminal apparatus that performs communications with the base station apparatus by radio signal, and makes the computer execute a step for the radio network control apparatus to receive a packet from the mobile communication terminal apparatus via the base station apparatus and the internal network, and directly transfer the packet to the internal server via the internal network.

According to this program, since the radio network control apparatus receives a packet from the mobile communication terminal apparatus via the base station apparatus and the internal network, directly transfers the packet to the internal server via the internal network and the packet from the mobile communication terminal apparatus is directly transferred to the internal server without using a the operator communication apparatus and a public communication network, and it is thereby possible to provide a packet communication system with a small system scale which reduces traffic amounts of the operator communication apparatus and public communication network, while decreasing communication fees required corresponding to the traffic amounts, and eliminates the need of increasing processing capabilities of the operator communication apparatus and communication network.

This application is based on Japanese Patent Application No. 2003-284930 filed on Aug. 1, 2003, entire content of which is expressly incorporated by reference herein.

INDUSTRIAL APPLICABILITY

The present invention is applicable to a packet communication system provided with a user communication apparatus, an operator communication apparatus that performs communications with the user communication apparatus, and a communication network that performs communications with both the user communication apparatus and the operator communication apparatus.

FIG. 1
20 USER COMMUNICATION APPARATUS
21 INTERNAL NETWORK
23 INTERNAL SERVER
30 OPERATOR COMMUNICATION APPARATUS
40 RELAY NETWORK
50 PUBLIC COMMUNICATION NETWORK
60 EXTERNAL SERVER

FIG. 2
80 USER COMMUNICATION APPARATUS
21 INTERNAL NETWORK
23 INTERNAL SERVER
30 OPERATOR COMMUNICATION APPARATUS
40 RELAY NETWORK
50 PUBLIC COMMUNICATION NETWORK
60 EXTERNAL SERVER

FIG. 3
110 USER COMMUNICATION APPARATUS
111 INTERNAL NETWORK
113 INTERNAL SERVER
120 OPERATOR COMMUNICATION APPARATUS
130 RELAY NETWORK
140 PUBLIC COMMUNICATION NETWORK
150 EXTERNAL SERVER

FIG. 4
TO THE INTERNAL SERVER
201 IP PROCESSING SECTION
202 PPP PROCESSING SECTION
203 GTP-U PROCESSING SECTION
204 UDP/IP PROCESSING SECTION
205 L2/L1 PROCESSING SECTION TO THE EXTERNAL SERVER
206 INTERNAL ADDRESS TABLE
207 CONTROL SECTION TO EACH SECTION
208 PPP PROCESSING SECTION
209 PPCP PROCESSING SECTION
210 RLC PROCESSING SECTION
211 FP PROCESSING SECTION
212 L2/L1 PROCESSING SECTION

FIG. 5A
INTERNAL SERVER

FIG. 5B
EXTERNAL SERVER

FIG. 6
INTERNAL SERVER
EXTERNAL SERVER
CONTROL PLANE
USER PLANE
INTERNAL SERVER ACCESS

FIG. 7
510 USER COMMUNICATION APPARATUS
111 INTERNAL NETWORK
113 INTERNAL SERVER
120 OPERATOR COMMUNICATION APPARATUS
130 RELAY NETWORK
140 PUBLIC COMMUNICATION NETWORK
150 EXTERNAL SERVER

The invention claimed is:

1. A packet communication method in a packet communication system, the packet communication system comprising:
a user communication apparatus;
an operator communication apparatus that performs communications with the user communication apparatus; and
a communication network that performs communications with both the user communication apparatus and the operator communication apparatus, wherein:
the user communication apparatus comprises:
an internal network;
a base station apparatus connected to the internal network;
an internal server connected to the internal network;
a radio network control apparatus connected between the internal network and the operator communication apparatus; and
a mobile communication terminal apparatus that performs communications with the base station apparatus by radio signals, and
the operator communication apparatus comprises:
a serving general packet radio service support node connected to the radio network control apparatus through a relay network; and
a gateway general packet radio service support node connected between the serving general packet radio service support node and the communication network, and
wherein:
the packet communication method comprises:
(a) transmitting an active packet data protocol context request from the mobile communication terminal apparatus to the serving general packet radio service support node, setting up a radio access bearer between the serving general packet radio service support node and the mobile communication terminal apparatus, transmitting an activate packet data protocol from the general packet radio service support node to the mobile communication terminal apparatus and establishing a session for packet transfer between the serving general packet radio service support node and the mobile communication terminal apparatus; and
(b) when the mobile communication terminal apparatus accesses the internal server while the session for packet transfer is established between the serving general packet radio service support node and the mobile communication terminal apparatus, (i) in the mobile communication terminal apparatus, informing, over the radio access bearer, the serving general packet radio service support node of access of the internal server by the mobile communication terminal apparatus, and (ii) in the radio network control apparatus, transferring packets that are for the internal server and that are transmitted from the mobile communication terminal apparatus, directly to the internal server, without involving the serving general packet radio service support node.

2. A packet communication system comprising:
a user communication apparatus;
an operator communication apparatus that performs communications with the user communication apparatus; and
a communication network that performs communications with the user communication apparatus and the operator communication apparatus, wherein:
the user communication apparatus comprises:
an internal network;
a base station apparatus connected to the internal network;
an internal server connected to the internal network;
a radio network control apparatus connected between the internal network and the operator communication apparatus; and
a mobile communication terminal apparatus that performs communications with the base station apparatus by radio signals, and the operator communication apparatus comprises:
a serving general packet radio service support node connected to the radio network control apparatus through a relay network; and
a gateway general packet radio service support node connected between the serving general packet radio service support node and the communication network, and
wherein:
the serving general packet radio service support node receives an active packet data protocol context request transmitted from the mobile communication terminal apparatus, sets up a radio access bearer between the serving general packet radio service support node and the mobile communication terminal apparatus, transmits an activate packet data protocol from the general packet radio service support node to the mobile communication terminal apparatus and establishes a session for packet transfer between the serving general packet radio service support node and the mobile communication terminal apparatus; and
when the mobile communication terminal apparatus accesses the internal server while the session for packet transfer is established between the serving general packet radio service support node and the mobile communication terminal apparatus, the mobile communication terminal informs, over the radio access bearer, the serving general packet radio service support node of access of the internal server by the mobile communication terminal, and the radio network control apparatus transfers packets that are for the internal server and that are transmitted from the mobile communication terminal apparatus, directly to the internal server, without involving the serving general packet radio service support node.

\* \* \* \* \*